Jan. 22, 1963  J. H. BREWER  3,074,853
SEROLOGICAL TEST CARD WITH COLOR SOLID
AS VISUALIZING AGENT
Filed June 22, 1961
Fig. 1.
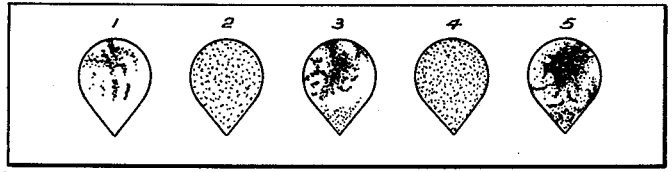
Fig. 2.
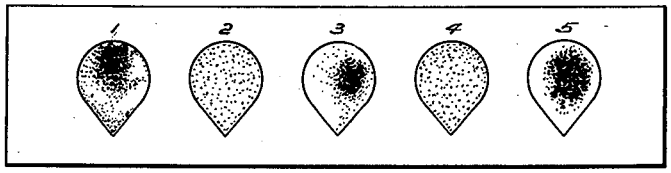
Fig. 3.
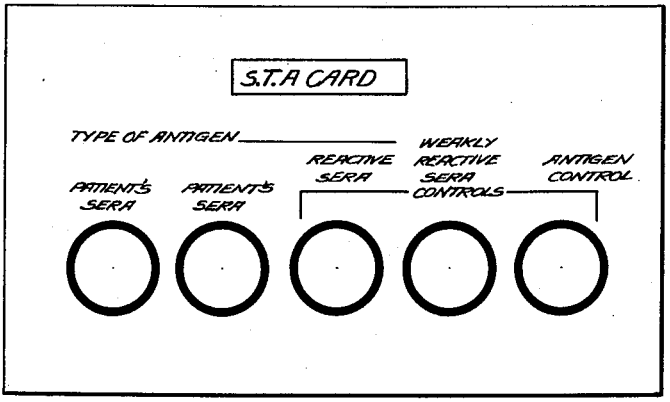
Fig. 4.

United States Patent Office 3,074,853
Patented Jan. 22, 1963

3,074,853
SEROLOGICAL TEST CARD WITH COLOR SOLID AS VISUALIZING AGENT
John H. Brewer, Towson, Md., assignor to Hynson, Westcott & Dunning Incorporated, a corporation of Maryland
Filed June 22, 1961, Ser. No. 118,824
8 Claims. (Cl. 167—84.5)

This application is a continuation-in-part of my application Serial No. 94,189, filed March 8, 1961, now abandoned.

This invention relates to a method of and means for carrying out immunological and similar reactions in which proteins, polysaccharides etc. in solution are caused to react either in the absence or in the presence of solid material such as blood cells or fragments thereof to give a precipitate. Typical of such reactions are the well known antigen-antibody reactions commonly known as precipitin and agglutination reactions depending upon whether solid matter is absent or present respectively in one or both of the solutions.

An obect of my invention is to greatly simplify the procedure normally followed in carrying out such reactions.

Another object of the invention is to simplify and to dispense with some of the equipment commonly used in carrying out such reactions.

A further object of the invention is to make the results of the reactions more sharply defined and more readily observable.

A further object of the invention is to make the results of the reaction more or less permanent and storable as a record and for re-examination.

Still another object of my invention is to provide a method and means for carrying out antigen-antibody reactions which will tend to avoid the weak and doubtful results heretofore sometimes obtained by methods heretofore employed i.e. to make the results clearly and definitely either positive or negative.

Other objects and advantages of the invention will appear in the following description of the invention.

As indicated above, at least for the purpose of describing the present invention an agglutination reaction is to be regarded as being a reaction between substances in two miscible liquids at least one of the reactants being or comprising a solid such as bacteria or blood cells or fragments which are agglomerated as a result of the reaction. A precipitin reaction on the other hand is to be regarded as being a reaction between substances in two liquids both of which are free of suspended solids. A precipitin reaction results in the precipitation and flocculation of solid matter but the results of such reactions frequently are difficult to observe and evaluate.

The words antigen and antibody are used herein in the broad sense to embrace all substances e.g. microorganisms, viruses and their biological products which are capable of giving immunological reactions e.g. precipitin, agglutination or flocculation reactions.

Heretofore the results of precipitin reactions have been made more readily observable by suspending a finely divided solid in one or the other of the two liquids involved, which suspended solid is caused, by the reaction, to agglutinate and thus to give a more readily observable evidence of the reaction.

It has also been proposed heretofore (see U.S. Patent No. 2,770,572) to carry out agglutination reactions by depositing the evaporation residue of an antiserum to be tested on a supporting surface, wetting the deposit with blood liquid containing blood cells and observing the results.

Now I have found that reactions of the type referred to above may be carried out more readily and the results rendered more definite and readily observable by suspending a finely divided solid in a liquid, forming a coating of the resulting suspension upon a suitable support having a contrasting color with respect to said solid, wetting said coating successively with the liquids to be tested and observing the results. In its preferred embodiments the process of the present invention involves the use of one or the other of the two liquids to be tested for the antigen-antibody reaction as the suspending liquid for the finely divided solid and also the additional steps of drying the initial coating of the suspension of finely divided solid on the support and then rewetting it with the other liquid to be tested or preferably first rewetting the dried coating with an indifferent liquid such as water or saline solution and then applying the second liquid to be tested. The test spot may be dried either before, during or after the observation of the results, after applying the second test liquid and thus the test results may be preserved for subsequent observation. The complete procedure may include also the well known step in making immunological tests of repeatedly tilting or shaking the support which generally serves to accentuate the test results. Thus, in effect, due to the presence of the finely divided solid, precipitin reactions are converted into agglutination reactions and the results of agglutination reactions are made more readily observable. Further details of the method and means involved in the testing procedure outlined above will be described hereinafter. It has been found to be advantageous when the suspension of finely divided solid is dried on the supporting surface and then rewetted as described above to include a small amount of a humectant such as glycerine in the suspension.

First as to the support or supporting surface upon which the deposit of finely divided solids is formed I have found that it must be quite smooth e.g. as smooth as the surface of well calendered paper or cardboard so that the roughness of the surface shall not obscure the test results or give a false indication. The surface may vary in smoothness from that of calendered paper or cardboard to as smooth as glass. The surface must be readily wettable by the liquid vehicle of the suspension of finely divided solids, generally water, so that the deposited coating shall be smooth and uniform in appearance. The support may be more or less absorbent as in the case of cardboard or paper which is sufficiently sized to be capable of being written upon with aqueous ink and such limited absorbency may be advantageous in some instances in that, by absorbing the liquid vehicle of the applied liquids it hastens the dehydration of the test spot and thus shortens the time required to obtain the test results. It is noted however that a base of high absorbency such as blotting paper is not useful not only because it has a too rough surface but also because the test liquid is drawn into the paper and fails to form a surface coating. I have found in some instances in which the reactive agent apparently is of small molecular size that even a base having a limited absorbency such as sized and calendered cardboard suitable for being written upon with aqueous ink is not suitable for use in my test method because it appears that the reactive agents are absorbed into the base along with the vehicle and fail to deposit on the surface and give a reaction thereon of the required intensity for ready observation of the results. Generally I have found supporting surfaces which are only semipermeable i.e. which absorb liquids such as water but do not absorb proten molecules or which are impermeable i.e. do not absorb liquids such as water are preferred. In using an impermeable support the drying of the test spot must result entirely from evaporation unaided by absorption and the drying of the test spot will therefore be slower than when an absorbent or semipermeable support is used. An example of a suitable absorbent support is cardboard such as is commonly used as index cards. An example of a suitable impermeable support is a sheet having a backing of paper or cardboard with a rolled on or otherwise integrated surface layer of a water wettable but water impermeable coating material such as polyethylene. A film of a water permeable or impermeable material could be used alone without a paper or cardboard backing but the transparency of such films makes the observation of results difficult unless the test spot on the film is observed while the film is superposed over a surface of contrasting color to that of the finely divided solid e.g. white in the case of black or highly colored solids. Similarly the film or coating may be semipermeable i.e. capable of absorbing water but not protein and the like molecules e.g. cellulose acetate films or coatings. In the case of a normally colorless and transparent film it may be colored to the desired contrasting color e.g. white by the inclusion of a pigment in the composition from which the film is formed. In the case of permeable and semipermeable supports which absorb the liquid vehicle but not the reactive agent of the liquid being tested the absorption of the liquid tends to concentrate the active agent at the surface of the support and thus to promote reaction between the reactive agents but it will be appreciated that this concentration of the reactive agents will occur also, in the case of an impermeable support as the result of evaporation. Thus an absorbent support merely tends to hasten the final results of the test. A film which absorbs water such as cellulose acetate film mounted upon a support such as cardboard has been found to be defective in some instances because it tends to wrinkle upon being wetted and dried and thus to obscure the results of the antigen-antibody reaction.

It will be appreciated that the words permeable and impermeable are used herein in the commonly accepted sense and not in the absolute sense.

A variety of finely divided solids may be used. Generally, and particularly when the finely divided solid is mixed with one or the other of the liquids involved in the test to form a suspension it is preferable to use a solid adsorbent such as activated charcoal which has the merit of being highly adsorbent and of having a suitable color (black) for use on a support made of or having a backing of white paper or cardboard and of being readily available in a suitable finely divided form. However other finely divided solids such as paint or ink pigments may be used. In some instances as in the case of activated charcoal there is a true adsorption of the reactive agent on the solid but with other pigments which are not generally regarded as having adsorbent properties there may be little or no adsorption and the reaction which takes place may be merely a co-agglutination, with the finely divided solid being carried along with the precipitate and serving as a visualization agent. However it is considered that in the case of all finely divided solids tested some adsorption occurs i.e. there is some degree of concentration of the molecules of the active agent on or adjacent to the surfaces of the solid particles. Finely divided solids other than the activated charcoal and paint and ink pigments, referred to above, which may be used are ion exchange resins, and adsorbent silica, alumina and kaolin. If the finely divided solid adsorbent to be used does not have the desired contrasting color it may be colored by treatment with a suitable dye such as the aniline dyes. Or it may be made visible under ultra violet light by treatment with a fluorescent material such as fluorescein. An example of a suitable ion exchange resin is one available commercially under the name "Amberlite" C.G. 50 type. This material is described as being 400–600 mesh and as being a synthetic, weakly acidic cation exchange resin of the carboxylic acid type, hydrogen form and chromotographic grade. Before use on a white suport this resin should be colored a suitable dark color e.g. black, by treatment with a basic dye.

So far as appears there is no lower limit to the particle size of the finely divided (adsorbent) material used. The upper limit of the particle size cannot be precisely stated. It depends to some extent upon the ability of the precipitate formed to agglomerate the particles of the finely divided solids and some precipitates evidently have a stronger agglomerating action than others. The particle size, 400–600 mesh, stated above is of course within the useful range but the useful range may be more broadly defined as being from submicroscopic to macroscopic. The useful particle size range may be otherwise described as being such that a coating of a suspension of the finely divided solid on a smooth surface such as cardboard will appear to the naked eye to be smooth and uniform i.e. free of visible individual particles. All such particles are capable of visible agglomeration.

As appears from the foregoing description the support must have a smooth surface and must be wettable by the liquid vehicle, generally water, of the liquids to be tested and may have a limited absorbency or may be semipermeable or impermeable, the latter generally being preferred. The finely divided solid may be adsorbent or nonadsorbent, it must have a contrasting color with respect to the support and it must be sufficiently fine to be agglomerated by the precipitate formed by the antigen-antibody reaction.

The invention is particularly useful in the case of precipitin reactions in which solutions of reactants which are free of finely divided solids are reacted but the invention is useful also for making the results of agglutination reactions in which one or the other of the reactant liquids contains a suspended solid more readily visible. In this case the added finely divided solid having a contrasting color joins with the solids normally present in the precipitate to make the results of the precipitation more readily visible.

Briefly the preferred method in accordance with the present invention consists in selecting a suitable support having a smooth, white, water-wettable but substantially water-impermeable surface such as a 3 x 5 inch cardboard index card having a strongly adherent surface coating such as polyethylene and a thickness of the order of .020 inch, (2) forming a suspension of a finely divided, preferably adsorbent solid having a contrasting color with respect to the support e.g. activated charcoal in an aqueous liquid containing the antigen or antibody to be reacted, (3) preferably but not necessarily dissolving a small amount of a water-soluble adhesive such as methyl cellulose or solubilized casein in said suspension, (4) depositing a drop or so of said suspension on said support, spreading it and permitting it to dry (5) preferably but not necessarily spray coating the dried evaporation residue with a solution of a water soluble adhesive such as methylcellulose or solubilized casein and permitting it to dry, (6) wetting the evaporation residue with a suitable inert liquid such as water, saline or buffer solution (7) applying the liquid to be tested for antigen-antibody reaction to the rewetted evaporation residue and spreading it thereon (8) tilting or shaking the support as is customary in making immunological tests and (9) examining the surface for visual evidence of agglutination or agglomeration. In this preferred method in which the suspension of solids is dried upon the support it is advantageous, i.e. it facilitates the rewetting of the dried coating, to include a small amount of a humectant such as glycerine in the suspension of solids which is applied to the support e.g. about 0.5 to 1% by volume of glycerine.

When an adsorbent finely divided solid such as activated charcoal is used a preferred procedure is to mix the antigen or antibody solution with a small amount, e.g. a few milligrams, of the adsorbent, the mixture is agitated for a sufficient time to permit adsorption, the mixture is settled or centrifuged to concentrate the adsorbent carrying the adsorbed antigen or antibody, if any is present in the liquid, the concentrated adsorbent may then be washed if desired, the adsorbent is then resuspended in an inert liquid, e.g. about 5 ml. of water, optionally a water soluble adhesive such as methylcellulose and a humectant such as glycerine are added to a concentration of 0.5 to 1% and the resulting suspension is deposited on the support and spread to a relatively thin, uniform layer and dried. The water soluble adhesive, if used, serves to stabilize the suspension of the finely divided solid and also to give a more durable dried coating of the suspension on the support. The dried coating of finely divided solid may be made more durable i.e. prevented from rubbing off by applying a coating of a water soluble adhesive such as methylcellulose or solubilized casein to the coating in a manner that will not disturb the coating e.g. by spray coating. A dilute solution of the adhesive e.g. 1% or less may be used.

As indicated above either the antigen or antibody may be adsorbed and treated with a solution of the other but it generally is preferred to adsorb the antigen and to treat it with a solution of the antibody. For instance the method can be used for the identification of a disease. In that case test spots are formed of an adsorbent on which the antigen of the suspected disease is adsorbed. This antigen may be adsorbed from whole or lysed cells of the disease in which the antigen or toxin is within the cells or from the liquid (culture medium) in which the cells of the disease have been grown, containing the metabolic products (exotoxin) of the disease (e.g. diphtheria, tetanus). Dried spots of evaporation residue of a suspension of adsorbent carrying the antigen are then formed and treated with the liquid which is suspected of containing the antibody of the disease in question e.g. the blood serum of a person suspected of being a typhoid carrier.

In the case of syphilis and some other diseases the antigin may be something other than the specific causative agent of the disease but which which is known to give a reaction with the antibody of the disease.

The test spots of dried residue of a suspension of an adsorbent referred to above may be of any desired size or shape e.g. circular, as shown in FIG. 3, square etc. or the falling drop shape illustrated in FIGS. 1 and 2 of the accompanying drawings. As to size I prefer a falling drop shaped area the major axis of which is about ¾ inch and the minor axis of which is about ½ inch, a circular area ¾ inch in diameter or a square area ¾ inch on a side. The coating on the spot may be formed by applying and distributing about 1 drop (1/20 cc.) of the adsorbent suspension. The suspension must of course be sufficiently concentrated with respect to the adsorbent to give a readily visible coating e.g. gray in the case of activated carbon on white cardboard.

The tests can be carried out without shaking or heating but I prefer to develop the results of the agglutination reaction by shaking the test cards at a temperature of 20–40° C. The shaking preferably is carried out on a horizontal disc about 1 foot square gyrated at about 120–180 strokes per minutes with an eccentric motion of about ⅝ inch. The effect of shaking at different speeds of rotation is shown in the drawings in which—

FIG. 1 is a plan view of a series of five tests in which the card was gyrated at a slow speed i.e. 120 strokes or less with a large eccentric motion, FIG. 2 is a plan view of the same tests carried out at a higher speed of gyration with a smaller eccentric motion, and FIGS. 3 and 4 are plan views of the front and back sides respectively of a test card.

As will be seen by comparing FIGS. 1 and 2 the agglutinated particles are more highly concentrated or agglomerated in FIG. 2 than in FIG. 1.

As has been stated the tests may be performed without shaking the cards e.g. by simply tilting the cards back and forth or even without this and the agglutination generally will be readily visible, if present, but I prefer shaking as described to hasten the agglomeration and to make the test results more clearly and unmistakably visible.

The tests illustrated in FIGS. 1 and 2 were tests for typhoid. The test spots 1 to 5 were coated with activated carbon carrying typhoid antigen and spots 1, 3 and 5 were treated with the serum of a person having typhoid fever while spots 2 and 4 were treated with serum from persons not having typhoid.

EXAMPLE 1

*Preparation of Test Card*

Typhoid organisms are grown in a suitable medium. An extract of the organisms is then made by lysing and a few milligrams of finely divided activated carbon are added to the extract and the mixture agitated for at least a few minutes. The mixture is then centrifuged and the carbon particles collected and diluted with 5 ml. of water. 1% of methylcellulose is dissolved in the resulting suspension and the resulting liquid coated upon a white test card to form test spots as illustrated in the drawings and dried. The cardboard was coated before forming the test spots with a highly diluted solution of cellulose acetate to provide a water permeable, protein impermeable surface. In this as in most cases a test card having a water impermeable surface such as polyethylene also may be used.

*Use of Test Card*

A patient suspected of having typhoid fever is bled and the serum collected. The spots on the test card are each wetted with one drop of water and then a drop of the patient's serum is added to spots 1, 3 and 5 while spots 2 and 4 are wetted with blood serum known to be free of typhoid antibodies. The test card is then placed in a laboratory shaking machine and shaken at 120 gyrations per minute. Shaking may be continued and the card examined from time to time until the spots are dry and/or no further development of agglomeration occurs, e.g. about 5 minutes. By carrying out the above described test with different dilutions of the person's blood serum some idea of the titer of the serum may be obtained by observation of the test spots.

EXAMPLE 2

*Test for Syphilis*

The regular VDRL alcohol and buffer stock solutions are used. After adding 0.5 ml. of the alcohol stock solution to 0.4 ml. of buffer in the usual way, 2.05 ml. of buffer are added, and shaken in the conventional manner. To this antigen solution, 1.5 mg. of charcoal are added and shaken thoroughly. The resulting suspension of charcoal in antigen solution is stored in the icebox and should not be used for 24 hours, but probably maximum sensitivity is not reached for 36–48 hours. If it is stored in the icebox when not in use, this sensitivity is retained for at least three to four days. When this antigen solution-charcoal suspension is used in a wet test, one drop thereof is mixed with one drop of serum on a test card and shaken for four minutes at 160–180 r.p.m. on a Fisher Clinical Rotator. Generally the results can be interpreted even after the card is dry.

To run the test on a card on which the antigen solution-charcoal suspension has dried specific directions applicable in all cases cannot be given. It has been found in experimenting with different finishes on the card that a slightly different set of conditions is required for each. In general, two to three times as much charcoal-containing antigen solution as was used in the wet test is vacuum dried on the card in the presence of varying amounts of glycerin and/or methylcellulose. To run the test, a drop of water is usually added to the dried spot and then the serum to be tested is applied. After mixing thoroughly, the card is shaken at from 130–180 r.p.m., depending on the finish on the card. The results preferably are interpreted before the card is dry.

A set of conditions which has worked for the dry test is outlined as follows:

The spot to be dried is made up of one drop of 2.5% glycerin and three drops of antigen-charcoal suspension as described above. The spot is mixed and spread out evenly to cover the test area and the card is dried in vacuum for one to two hours at room temperature. It is ready to use except that for one to two days the controls sometimes are not as good as they will be after longer standing. These cards are stored at room temperature, protected from moisture.

To run the test on the dry card, one drop of distilled water is added to each spot and then one drop of the sera to be tested is applied. Each spot is mixed, spread out and the card rotated at 160–180 r.p.m. for four minutes.

It should be noted that the quantities of liquid used are very important.

EXAMPLE 3

A suspension of activated charcoal in water or in a dilute solution of an adhesive such as methylcellulose with or without an addition of humectant such as glycerine is coated in spots upon a card having a suitable smooth white surface and dried. Thereafter the spots are wetted successively with the suspected antigen and antibody solutions or first with water and then successively with the suspected antigen and antibody solutions, mixed by stirring, tilted or shaken while the spots are drying and observed for the appearance of agglomeration of the charcoal particles.

EXAMPLE 4

An advantageous procedure when a large number of tests are to be made is as follows:

Activated charcoal is suspended in antigen solution and the suspension is introduced into a small vial and evaporated and dried therein and the vial sealed for storage and future use. Or the charcoal suspension in the antigen solution may be evaporated to dryness elsewhere and the resulting residue transferred to a sealed vial for future use. When the material in the vial is to be used the vial is opened, a small amount e.g. 2.5 ml. of diluent e.g. water, is added and the vial reclosed and shaken to resuspend the activated charcoal. Shaking for a short time, e.g. 10 seconds, generally is sufficient. The resulting suspension may be used immediately but generally it is preferred to let it stand for a short time, say 15 minutes before it is used. The amount of suspending liquid to be added to the vial will of course depend upon the size of the vial and the amount of lyophilized antigen-charcoal which it contains. The figure 2.5 ml. given above is suitable for a lyophilized deposit of a few milligrams. The resuspended antigen-charcoal mixture is applied to a test card in spots, about 1 drop per spot and then one drop of the serum to be tested is added to each spot, the spots are mixed e.g. by stirring with a tooth pick, the card is then shaken at 160 r.p.m. for 4 minutes and the results read while the test spots are still wet.

The foregoing method is advantageous when a large number of tests are to be made. The method gives accurate results having been tested with the sera of both positive and negative patients and the results have checked with the results obtained by the use of freshly made antigen. The method has the advantage when a number of tests are to be made that it permits storage of the antigen-adsorbent mixture in the dry state but avoids the resuspension of the adsorbent in each of a large number of test spots formed of dried antigen-adsorbent suspension.

The method of my invention eliminates the overnight or 24 hour incubation commonly used in making precipitin tests and it also eliminates most of the apparatus commonly used in making such tests. All tests are or may be made at room temperature. In carrying out my process all that is required is the test card bearing test spots as described, a container such as a dropper containing the liquid to be tested and preferably but not necessarily a shaker. Obviously my method is adapted to be carried out in a doctor's office, in a patient's room or in the field.

I claim:

1. A method of carrying out an immunological test which comprises forming and spreading a mixture of a finely divided added solid and two liquids to be tested for antigen-antibody reaction in a test spot on a substantially plane solid sheet having a smooth wettable surface of a contrasting color with respect to said solid and examining said spot for visual evidence of the agglomeration of said solid, said added solid being chemically inert to and insoluble in said liquids.

2. A method as defined in claim 1 in which said mixture is formed by depositing a suspension of said solid in one of said liquids upon said sheet and mixing said suspension with the other of said liquids.

3. A method as defined in claim 2 in which the finely divided solid is an adsorbent.

4. A method as defined in claim 2 in which the finely divided solid is activated charcoal.

5. A method as defined in claim 2 in which the deposited suspension is dried prior to being mixed with the other of said liquids.

6. A test card for the performance of immunological tests comprising a solid sheet having a smooth, wettable surface and a deposit thereon of a finely divided solid having a contrasting color and a reactant selected from the group consisting of antigens and antibodies.

7. A test card as defined in claim 6 in which the finely divided solid is an adsorbent.

8. A test card as defined in claim 6 in which the finely divided solid is activated charcoal.

References Cited in the file of this patent

UNITED STATES PATENTS

| | | |
|---|---|---|
| 2,143,088 | Rockwell | Jan. 10, 1939 |
| 2,342,409 | Levy | Feb. 22, 1944 |
| 2,770,372 | Eldon | Nov. 13, 1956 |
| 2,952,585 | Heller | Sept. 13, 1960 |

OTHER REFERENCES

Thalhimer, J. Am. Med. Assoc. (2), vol. 118, No. 5, Jan. 31, 1942, pp. 370–372.

Thalhimer, J. Am. Med. Assoc. (1), vol. 149, No. 10, July 5, 1952, pp. 928–929.